United States Patent
Taherzadeh Boroujeni et al.

(10) Patent No.: US 11,979,887 B2
(45) Date of Patent: May 7, 2024

(54) ADAPTIVE CONTROL CHANNEL AGGREGATION RESTRICTION

(71) Applicant: QUALCOMM Incorporated, San Diego, CA (US)

(72) Inventors: Mahmoud Taherzadeh Boroujeni, San Diego, CA (US); Jelena Damnjanovic, Del Mar, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/366,678

(22) Filed: Jul. 2, 2021

(65) Prior Publication Data

US 2022/0030559 A1    Jan. 27, 2022

Related U.S. Application Data

(60) Provisional application No. 63/055,205, filed on Jul. 22, 2020.

(51) Int. Cl.
*H04W 72/23*    (2023.01)
*H04W 72/51*    (2023.01)
*H04W 72/0453*   (2023.01)

(52) U.S. Cl.
CPC ........... *H04W 72/23* (2023.01); *H04W 72/51* (2023.01); *H04W 72/0453* (2013.01)

(58) Field of Classification Search
CPC .......................... H04W 72/23; H04W 72/0453
USPC .......................................................... 370/329
See application file for complete search history.

(56) References Cited

U.S. PATENT DOCUMENTS

| 11,683,826 B2 * | 6/2023 | Kutz | H04L 1/0069 |
| | | | 370/329 |
| 2013/0044664 A1 * | 2/2013 | Nory | H04L 1/0045 |
| | | | 370/336 |

* cited by examiner

*Primary Examiner* — Angel T Brockman
(74) *Attorney, Agent, or Firm* — Patterson + Sheridan, L.L.P.

(57) ABSTRACT

Certain aspects of the subject matter described in this disclosure can be implemented in a method for wireless communication by a user equipment (UE). The method generally includes: selecting a subset of a plurality of decoding candidates of a search space in a control channel based on a property of each of the subset of the plurality of decoding candidates; monitoring the subset of the plurality of decoding candidates; and decoding control information in the control channel based on the monitoring of the subset of the plurality of decoding candidates.

30 Claims, 9 Drawing Sheets

500 ↘

505

SELECTING, BY A USER EQUIPMENT (UE), A SUBSET OF A PLURALITY OF DECODING CANDIDATES OF A SEARCH SPACE IN A CONTROL CHANNEL BASED ON A PROPERTY OF EACH OF THE SUBSET OF THE PLURALITY OF DECODING CANDIDATES

510

MONITORING, BY THE UE, THE SUBSET OF THE PLURALITY OF DECODING CANDIDATES

515

DECODING, BY THE UE, CONTROL INFORMATION IN THE CONTROL CHANNEL BASED ON THE MONITORING OF THE SUBSET OF THE PLURALITY OF DECODING CANDIDATES

FIG. 5

```
                                    ┌─ 605
SELECT, BY A BASE STATION (BS), A SUBSET OF A PLURALITY OF
DECODING CANDIDATES OF A SEARCH SPACE IN A CONTROL
CHANNEL BASED ON A PROPERTY OF EACH OF THE SUBSET OF THE
PLURALITY OF DECODING CANDIDATES
```

```
                                    ┌─ 610
GENERATE, BY THE BS, THE CONTROL CHANNEL HAVING CONTROL
INFORMATION BASED ON THE SELECTION
```

```
                                    ┌─ 615
TRANSMIT, BY THE BS, THE CONTROL CHANNEL TO A USER
EQUIPMENT (UE)
```

FIG. 6

ADAPTIVE CONTROL CHANNEL AGGREGATION RESTRICTION

CROSS-REFERENCE TO RELATED APPLICATION

This application claims benefit of and priority to U.S. Provisional Application No. 63/055,205 filed Jul. 22, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for communication of control information.

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved blind decoding operations.

Certain aspects of the subject matter described in this disclosure can be implemented in a method for wireless communication by a base station (BS). The method generally includes: selecting a subset of a plurality of decoding candidates of a search space in a control channel based on a property of each of the subset of the plurality of decoding candidates; generating the control channel having control information based on the selection; and transmitting the control channel to a user equipment (UE).

Certain aspects of the subject matter described in this disclosure can be implemented in a method for wireless communication by a UE. The method generally includes: selecting a subset of a plurality of decoding candidates of a search space in a control channel based on a property of each of the subset of the plurality of decoding candidates; monitoring the subset of the plurality of decoding candidates; and decoding control information in the control channel based on the monitoring of the subset of the plurality of decoding candidates.

Certain aspects of the subject matter described in this disclosure can be implemented in an apparatus for wireless communication by a BS, comprising: a memory; and one or more processors coupled to the memory, the memory and the one or more processors being configured to: select a subset of a plurality of decoding candidates of a search space in a control channel based on a property of each of the subset of the plurality of decoding candidates; generate the control channel having control information based on the selection; and transmit the control channel to a UE.

Certain aspects of the subject matter described in this disclosure can be implemented in an apparatus for wireless communication by a UE, comprising: a memory; and one or more processors coupled to the memory, the memory and the one or more processors being configured to: select a subset of a plurality of decoding candidates of a search space in a control channel based on a property of each of the subset of the plurality of decoding candidates; monitor the subset of the plurality of decoding candidates; and decode control information in the control channel based on the monitoring of the subset of the plurality of decoding candidates.

Certain aspects of the subject matter described in this disclosure can be implemented in an apparatus for wireless communication by a BS, comprising: means for selecting a subset of a plurality of decoding candidates of a search space in a control channel based on a property of each of the subset of the plurality of decoding candidates; means for generating the control channel having control information based on the selection; and means for transmitting the control channel to a UE.

Certain aspects of the subject matter described in this disclosure can be implemented in an apparatus for wireless communication by a UE, comprising: means for selecting a subset of a plurality of decoding candidates of a search space in a control channel based on a property of each of the subset of the plurality of decoding candidates; means for monitoring the subset of the plurality of decoding candidates; and means for decoding control information in the control channel based on the monitoring of the subset of the plurality of decoding candidates.

Certain aspects of the subject matter described in this disclosure can be implemented in a computer-readable medium having instructions stored thereon to cause one or more processors to: select a subset of a plurality of decoding candidates of a search space in a control channel based on a property of each of the subset of the plurality of decoding candidates; generate the control channel having control information based on the selection; and transmit the control channel to a UE.

Certain aspects of the subject matter described in this disclosure can be implemented in a computer-readable medium having instructions stored thereon to cause one or more processors to: select a subset of a plurality of decoding candidates of a search space in a control channel based on a property of each of the subset of the plurality of decoding candidates; monitor the subset of the plurality of decoding candidates; and decode control information in the control channel based on the monitoring of the subset of the plurality of decoding candidates.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication by a UE, in accordance with certain aspects of the present disclosure.

FIG. 6 is a flow diagram illustrating example operations for wireless communication by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
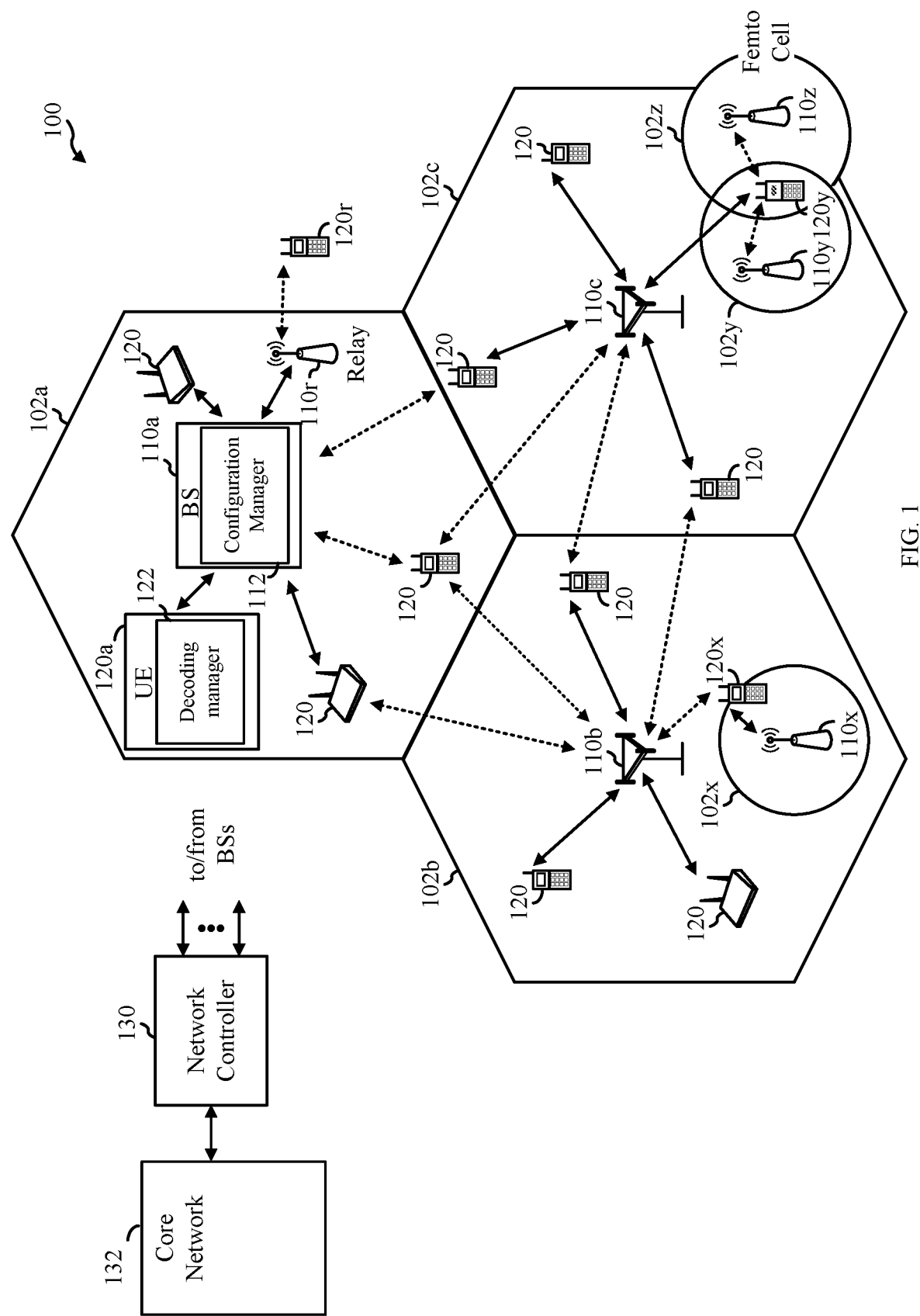
FIG. 1 is a block diagram conceptually illustrating an example telecommunications system, in accordance with certain aspects of the present disclosure.

Aspects of the present disclosure provide apparatus, methods, processing systems, and computer readable mediums for blind decoding. In some aspects, a search space may be configured with multiple decoding candidates, and only a subset of the decoding candidates may be monitored by a user equipment (UE). By only monitoring a subset of the decoding candidates, power consumption and resource usage may be reduced at the UE.

For example, a base station (BS) may select an aggregation level threshold, and indicate the aggregation level threshold to a UE. In one or more examples, the UE may then only monitor a subset of the decoding candidates having an aggregation level that is greater than (or less than) the indicated aggregation level threshold. In some cases, the UE may request a minimum aggregation level from the BS, and the BS may take the request from the UE into consideration when determining the aggregation level threshold to be applied. In some aspects, a search space may be configured along with a decoding candidate restriction (e.g., the aggregation level threshold). Dynamic signaling may then be used to activate (or deactivate) the decoding candidate restriction.

The following description provides examples of blind decoding operations in communication systems, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for configuration of decoding operations.

As shown in FIG. 1, the BS 110a includes a configuration manager 112. The configuration manager 112 may be configured to select a subset of a plurality of decoding candidates of a search space in a control channel based on a property of each of the subset of the plurality of decoding candidates, generate the control channel having control information based on the selection, and transmit the control channel to a UE, in accordance with aspects of the present disclosure. As shown in FIG. 1, the UE 120a includes a decoding manager 122. The decoding manager 122 may be configured to select a subset of a plurality of decoding candidates of a search space in a control channel based on a property of each of the subset of the plurality of decoding candidates, monitor the subset of the plurality of decoding candidates, and decode control information in the control channel based on the monitoring of the subset of the plurality of decoding candidates, in accordance with aspects of the present disclosure.

Figure 2:
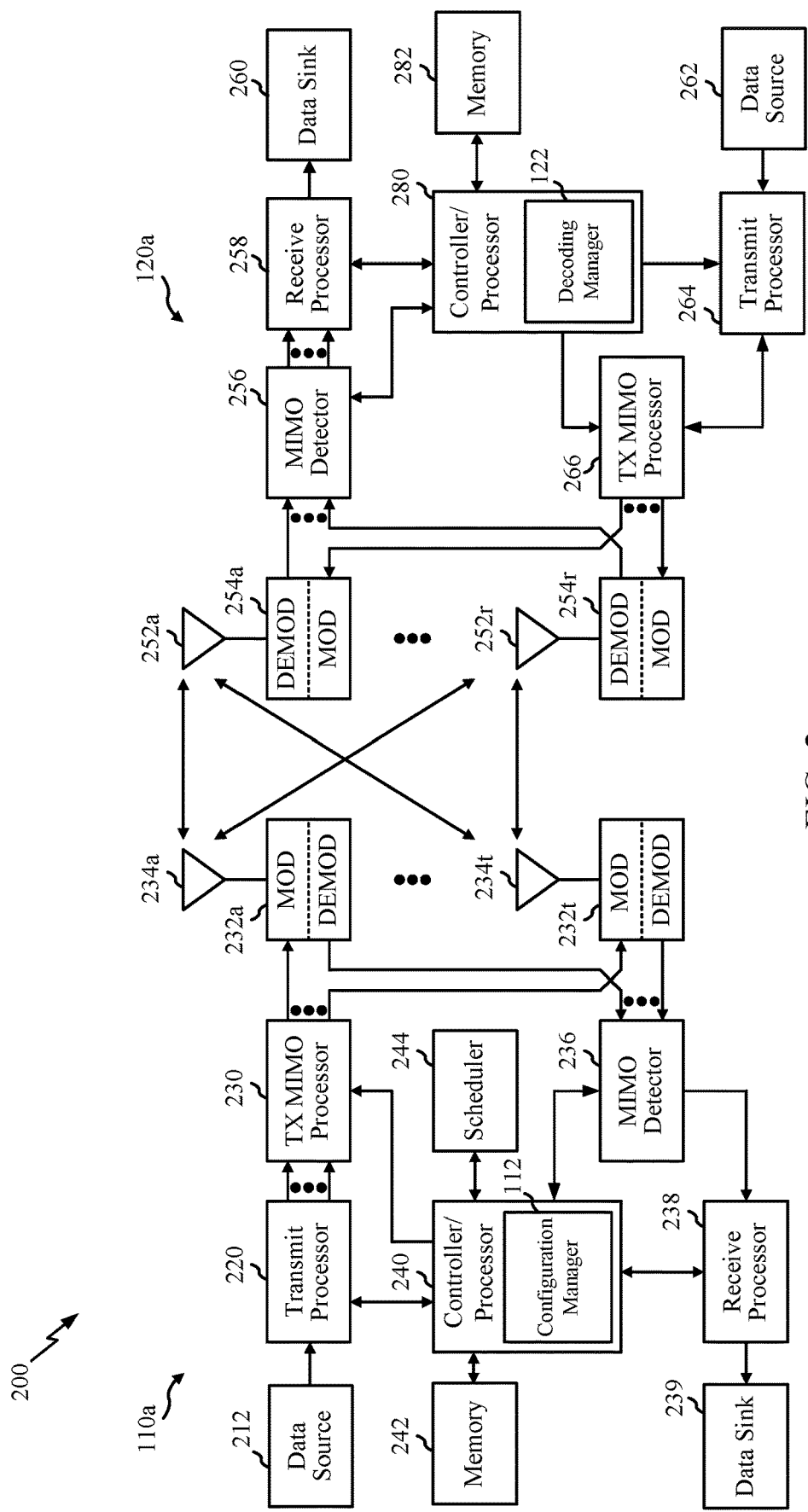
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARM) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM), etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the configuration manager 112, according to aspects described herein. As shown in FIG. 2, the controller/processor 280 of the UE 120a has the decoding manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (kHz) and other SCS may be defined with respect to the base SCS (e.g., 30 kHz, 60 kHz, 120 kHz, 240 kHz, etc.).

Figure 3:
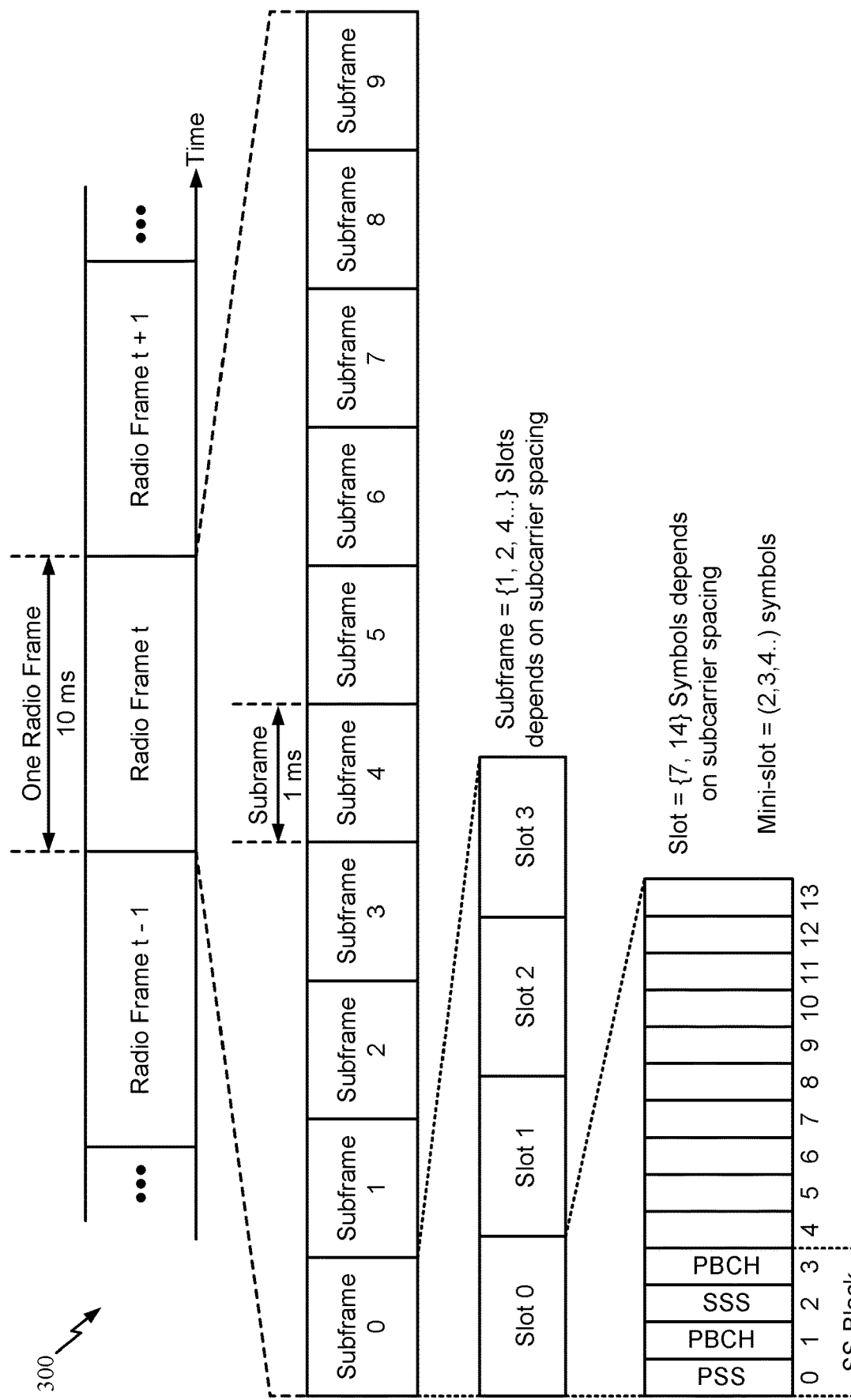
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Adaptive Control Channel Aggregation Restriction

Certain aspects of the present disclosure provide apparatus, methods, processing systems, and computer readable mediums for blind decoding. In some aspects, a search space may be configured with multiple decoding candidates, and only a subset of the decoding candidates may be monitored, resulting in reduced power consumption and resource usage at a user equipment (UE), as described in more detail herein.

In new radio (NR), the limits on the total number of physical downlink control channel (PDCCH) blind decodes, and also on the total number of control channel elements (CCEs) that are covered by monitored PDCCH candidates, may be defined per slot. In case a blind detection limit is surpassed, the search space with the last/largest index is dropped. The selection of the search space to drop may be without differentiation among candidates inside each search space. For higher frequencies and larger subcarrier spacing (SCS) (e.g., corresponding to shorter symbols), the available time for processing of PDCCH becomes much shorter, placing pressure on blind detection limits.

For power saving and resource usage purposes, it may be useful to reduce the number of PDCCH blind decodes. In some cases, such as when channel conditions are poor, blind detection of PDCCH candidates with low aggregation level by the UE and a scheduling base station (BS) (e.g., next generation NodeB (gNB)) may be difficult. In certain aspects of the present disclosure, certain decoding candidates of a search space, such as candidates with a low aggregation level, may not be monitored thereby allowing the UE to save power.

Figure 4:
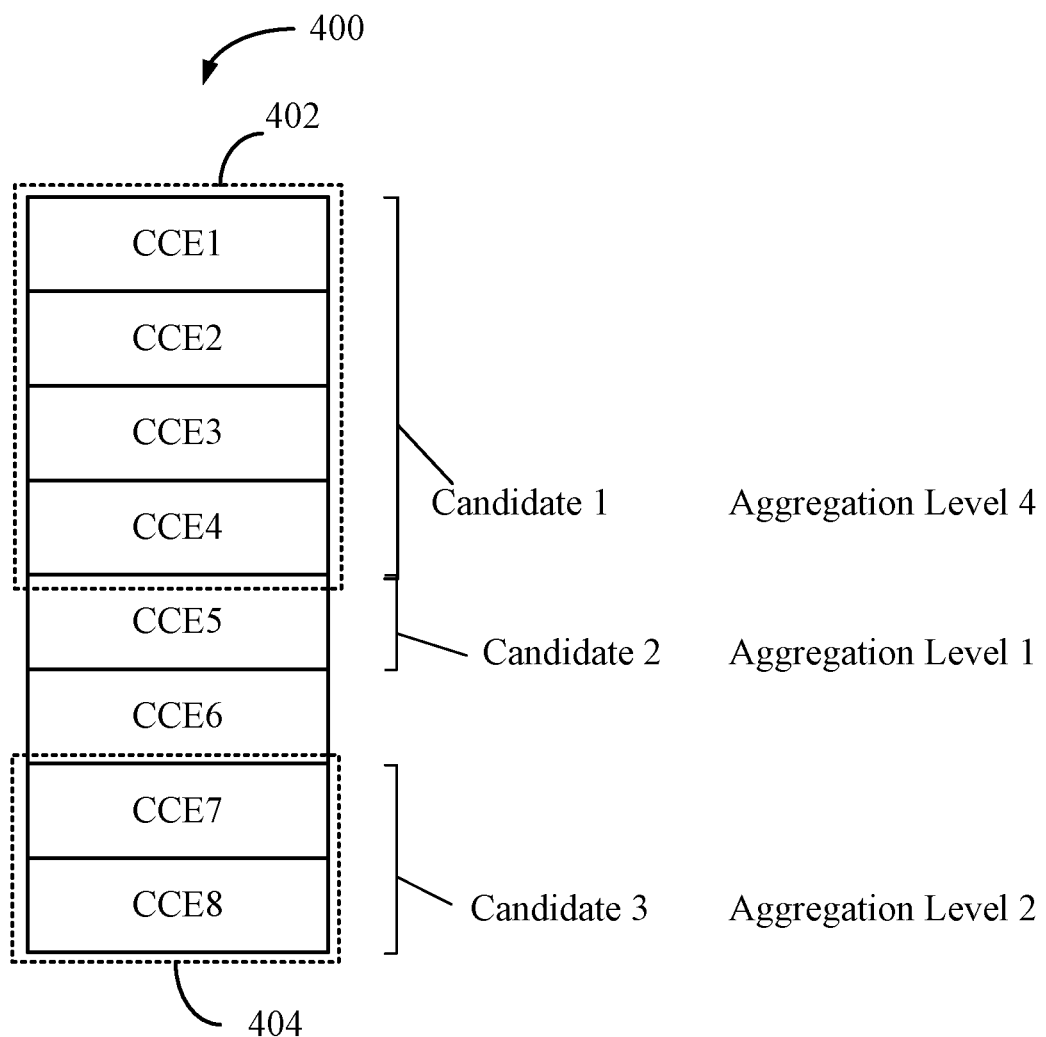
FIG. 4 illustrates a search space including multiple decoding candidates, in accordance with certain aspects of the present disclosure.

FIG. 4 illustrates a search space 400 including multiple decoding candidates. As illustrated, the search space 400 may include eight CCEs (CCE1-CCE8). For simplicity, the search space 400 is depicted as a collection of eight logically contiguous CCEs that are numbered consecutively; however, search space 400 may include a different number of CCEs than shown. In some cases, each of the CCEs may contain a fixed number of resource elements (REs) in non-contiguous locations. The CCEs may be arranged in non-contiguous locations within resource blocks (RBs) of one or more downlink (DL) control channels (e.g., PDCCH).

A UE may know that downlink control information (DCI) is in one of the decoding candidates. For each decoding candidate, the UE may generate a decoding output by descrambling and decoding a number of CCEs corresponding to a possible aggregation level (e.g., for aggregation level 2, the UE may generate a decoding output based on CCEs 7 and 8). The UE may then perform an error detection operation by performing a cyclic redundancy check (CRC).

As illustrated, a search space may be configured with multiple decoding candidates, and each of the decoding candidates may be associated with an aggregation level. For instance, decoding candidate 1 (e.g., decoding candidate 402) may be associated with an aggregation level of 4 and have four CCEs (e.g., CCEs 1-4 in some configurations), decoding candidate 2 may be associated with an aggregation level of 1 and have only one CCE (e.g., CCE 5 in some configurations), and decoding candidate 3 (e.g., decoding candidate 404) may be associated with aggregation level 2 and may have two CCEs (e.g., CCEs 7-8 in some configurations). Higher aggregation levels may increase the likelihood of successful decoding of control information, which may be especially important when channel conditions are poor.

Certain aspects of the present disclosure are directed to selection of a subset of each of one or more search spaces that are to be blindly detected in an attempt to avoid a waste of resources. For instance, a UE may perform blind detection only on a subset of PDCCH candidates of a search space, based on some properties of the PDCCH candidates (e.g. aggregation level, monitoring occasion, aggregation across monitoring occasions, or any combination thereof) and some dynamic signaling from the BS, the UE, or both.

FIG. 5 is a flow diagram illustrating example operations 500 for wireless communication by a user equipment (UE), in accordance with certain aspects of the present disclosure. Operations 500 may be performed, for example, by UE 120a in the wireless communication network 100. Operations 500 may be complementary operations by the UE to the operations 600 performed by the BS.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 may begin, at block 505, by the UE selecting a subset of a plurality of decoding candidates of a search space in a control channel based on a property of each of the subset of the plurality of decoding candidates. For example, with reference to FIG. 4, the search space 400 may include decoding candidates 402, 404, and the UE may select a subset of the decoding candidates (e.g., select decoding candidate 404). At block 510, the UE monitors the subset of the plurality of decoding candidates, and at block 515, the UE decodes control information in the control channel based on the monitoring of the subset of the plurality of decoding candidates.

FIG. 6 is a flow diagram illustrating example operations 600 for wireless communication by a base station (BS), in accordance with certain aspects of the present disclosure. Operations 600 may be performed, for example, by BS 110a in the wireless communication network 100. Operations 600 may be complementary operations by the BS to the operations 500 performed by the UE.

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 600 may begin, at block 605, by the BS selecting a subset of a plurality of decoding candidates of a search space in a control channel based on a property of each of the subset of the plurality of decoding candidates. In some aspects, the property of each of the subset of the plurality of decoding candidates includes an aggregation level of each of the subset of the plurality of decoding candidates, a monitoring occasion of each of the subset of the plurality of decoding candidates, whether the plurality of the decoding candidates are aggregated across monitoring occasion, or any combination thereof. For example, with reference to FIG. 4, the search space 400 may include decoding candidates 402, 404, and the BS may select a subset of the decoding candidates (e.g., select decoding candidate 404 having aggregation level 4). At block 610, the BS generates the control channel having control information based on the selection, and at block 615, the BS transmits the control channel to a UE.

In some cases, the BS may transmit, to the UE, an indication of the selected subset of the plurality of decoding candidates. For example, the BS may determine an aggregation level threshold, and the selection of the subset of the plurality of decoding candidates may be based on the aggregation level threshold. The BS may transmit, to the UE, an indication of the aggregation level threshold. In certain aspects, the indication may be transmitted dynamically via downlink control information (DCI) or medium access control (MAC)-control element (MAC-CE). In some implementations, the determination of the aggregation level threshold may involve selecting the aggregation level threshold from a set of aggregation level threshold options. The set of aggregation level threshold options may be dependent on an SCS associated with the control channel, a frequency range associated with the control channel, a capability of the UE, or any combination thereof.

In certain aspects, the BS may receive, from the UE, a request for a minimum aggregation level of decoding candidates, and the determination of the aggregation level threshold by the BS may be based on the request received from the UE. For example, the UE may request that a minimum aggregation level of 4 be used, in response to which the BS may restrict the decoding candidates to be monitored to only candidates that have an aggregation level of 4 or higher (e.g., decoding candidate 402). The request may be received via an uplink control information (UCI) or MAC-CE. In some cases, the request for the minimum aggregation level may be implied based on a capability of the UE, power consumption limitations of the UE, whether the UE has requested coverage enhancement, or any combination thereof. For instance, instead of transmitting an express indication of the requested minimum aggregation level, the requested minimum aggregation level may be implied using other signaling that may indicate, for example, a capability of the UE, power consumption limitations of the UE, or whether the UE has requested coverage enhancement.

In certain aspects, the search space may be one of a plurality of search spaces in the control channel, and the aggregation level threshold may be applied for a subset of the plurality of search spaces for determination of a subset of decoding candidates for each of the subset of the plurality of search spaces. The BS may select the subset of the plurality of search spaces to which the aggregation level threshold may apply based on a type of each of the subset of the plurality of search spaces, a Radio Network Temporary Identifier (RNTI) associated with each of the subset of the plurality of search spaces, a configuration of each of the subset of the plurality of search spaces, or any combination thereof.

In some cases, the BS may transmit an indication to activate or deactivate blind decoding using the subset of the plurality of decoding candidates. The indication to activate or deactivate the blind decoding using the subset of the plurality of decoding candidates may be performed via a UE-specific DCI, a group-common DCI, or MAC-CE.

In certain aspects, the activation or the deactivation of the blind decoding using the subset of the plurality of decoding candidates may be associated with an expiration timer. For example, the activation of blind decoding using the subset of the plurality of decoding candidates may automatically expire at the UE, after which the UE may continue blind decoding using the entirety of the plurality of decoding candidates.

Figure 7:
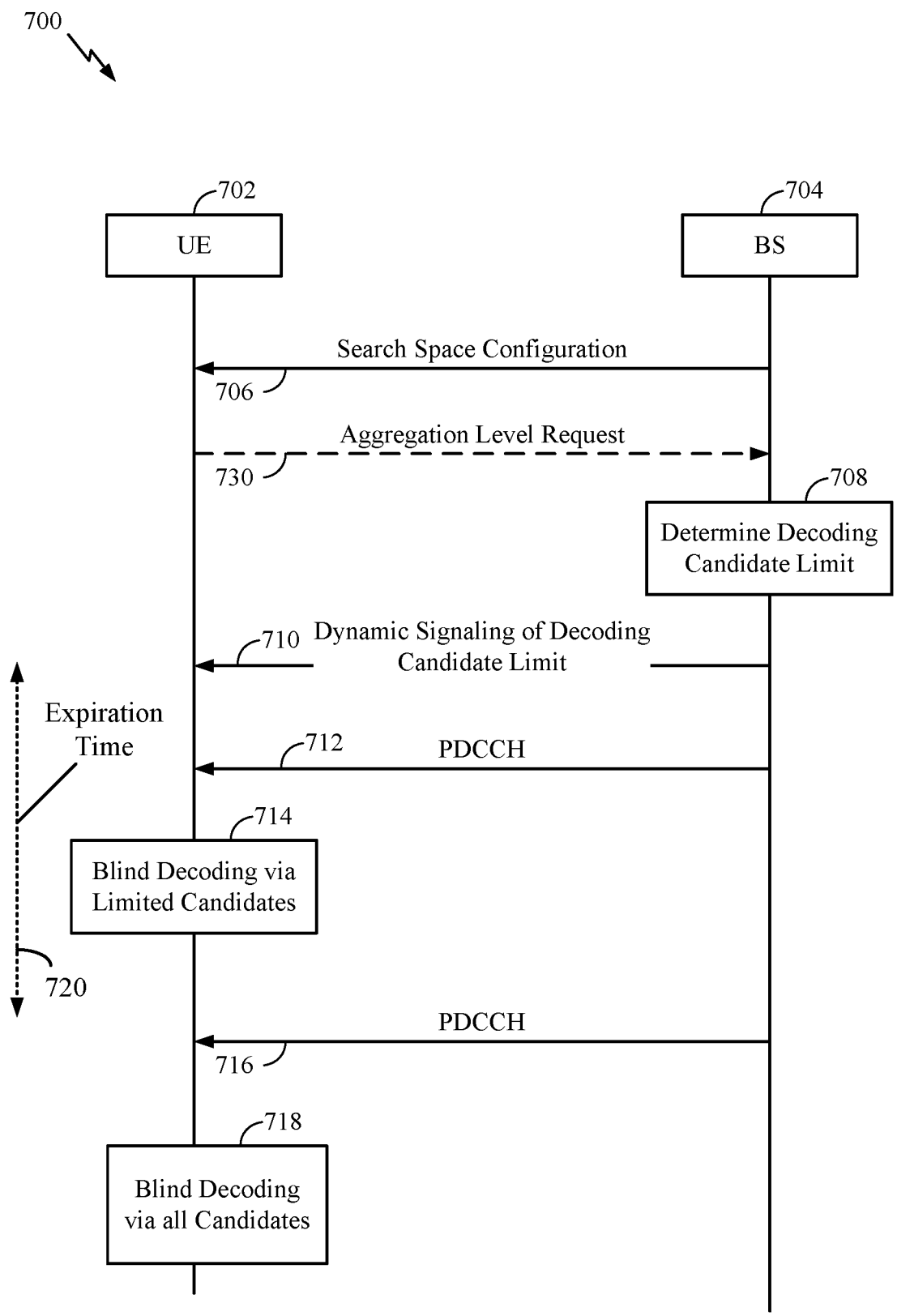
FIG. 7 illustrates a protocol for control channel communication, in accordance with certain aspects of the present disclosure.

FIG. 7 illustrates a protocol 700 for control channel communication, in accordance with certain aspects of the present disclosure. As illustrated, a BS 704 (e.g., a serving gNB) may transmit a search space configuration (e.g., via radio resource control (RRC) signaling) to a UE 702. The search space configuration may configure a set of decoding candidates for the search space. In some cases, decoding candidates of the search space may be associated with different aggregation levels, as described with respect to FIG. 4.

At block 708, BS 704 may determine a decoding candidate restriction. For example, BS 704 may determine a subset of the decoding candidates to be monitored by the UE (e.g., referred to as the active set of decoding or PDCCH candidates). In certain aspects, an active set of aggregation levels (for the active PDCCH candidates) may be selected by BS 704 (and signaled to UE 702) among a set of options defined in standard specifications and/or preconfigured for the search space. For example, at block 708, BS 704 may determine that UE 702 is to monitor only decoding candidates with an aggregation level of 2 or higher.

BS 704 may indicate (e.g., via dynamic signaling 710) the threshold for the aggregation level of the active PDCCH candidates. For instance, BS 704 may indicate, to UE 702, an aggregation level threshold and further indicate that UE 702 is to only monitor PDCCH candidates with aggregation levels higher than the aggregation level threshold, or only monitor PDCCH candidates with aggregation levels lower than the aggregation level threshold. The set of options for PDCCH aggregation thresholds may depend on a SCS associated with the control channel, a frequency range associated with the control channel, UE capability, or any combination thereof.

In some cases, UE 702 may send a request 730 for a minimum aggregation level for PDCCH, or recommend the minimum aggregation level, among a set of predefined and/or preconfigured options. The request 730 may be via UCI or MAC-CE. In some aspects, the request 730 from UE 702 may be implicitly indicated via some other signaling, as described herein. For instance, request 730 for the minimum aggregation level may be implied by a UE's capability, a UE's power consumption limitations, or a coverage enhancement request. For example, request 730 may be an indication of UE 702's capability, an indication of power consumption limitations of UE 702, or a request for coverage enhancement, which may also imply to BS 704 the minimum aggregation level requested by UE 702. When determining the decoding candidate limitation at block 708, BS 704 may take UE 702's request into consideration.

The dynamic indication of aggregation level restriction by BS 704, and/or the request 730 by UE 702, may be applicable for all search spaces or a subset of search spaces. In other words, UE 702 may be configured with multiple search spaces, and the aggregation level restriction may only apply to a subset of the search spaces. The subset may be determined based on the type of search space, associated RNTI, or any configuration associated with the search space.

In certain aspects, dynamic signaling 710 from BS 704 may activate and/or deactivate the restriction on PDCCH candidates. Dynamic signaling 710 may be via UE-specific, group-common DCI, or DL MAC-CE. The restriction on PDCCH candidates (e.g. based on aggregation level) may be defined in standard specifications, configured by BS 704 (e.g. via RRC signaling), or any combination thereof. For instance, the search space configuration 706 may configure not only the search space, but a decoding candidate restriction (e.g., aggregation level threshold). The decoding candidate restriction may then be activated (e.g., via dynamic signaling 710). For instance, dynamic signaling 710 may include a single bit indication to either activate or deactivate the RRC configured decoding candidate restriction.

In some aspects, the activation or deactivation indication may be associated with an expiration timer 720. The expiration timer may be indicated in dynamic signaling 710, preconfigured via RRC, or predefined in the specification. For instance, dynamic signaling 710 may activate the decoding candidate restriction, and the decoding candidate restriction may only be applied by UE 702 until expiration timer 720 expires.

As illustrated, UE 702 may receive a PDCCH 712, and perform blind decoding operations, at block 714, using the limited candidates (e.g., the subset of decoding candidates) as configured. UE 702 may also receive a PDCCH 716 after the expiration of the expiration timer 720, which UE 702 may decode, at block 718, using all decoding candidates of an associated search space because the decoding candidate restriction has expired.

Example Wireless Communications Devices

Figure 8:
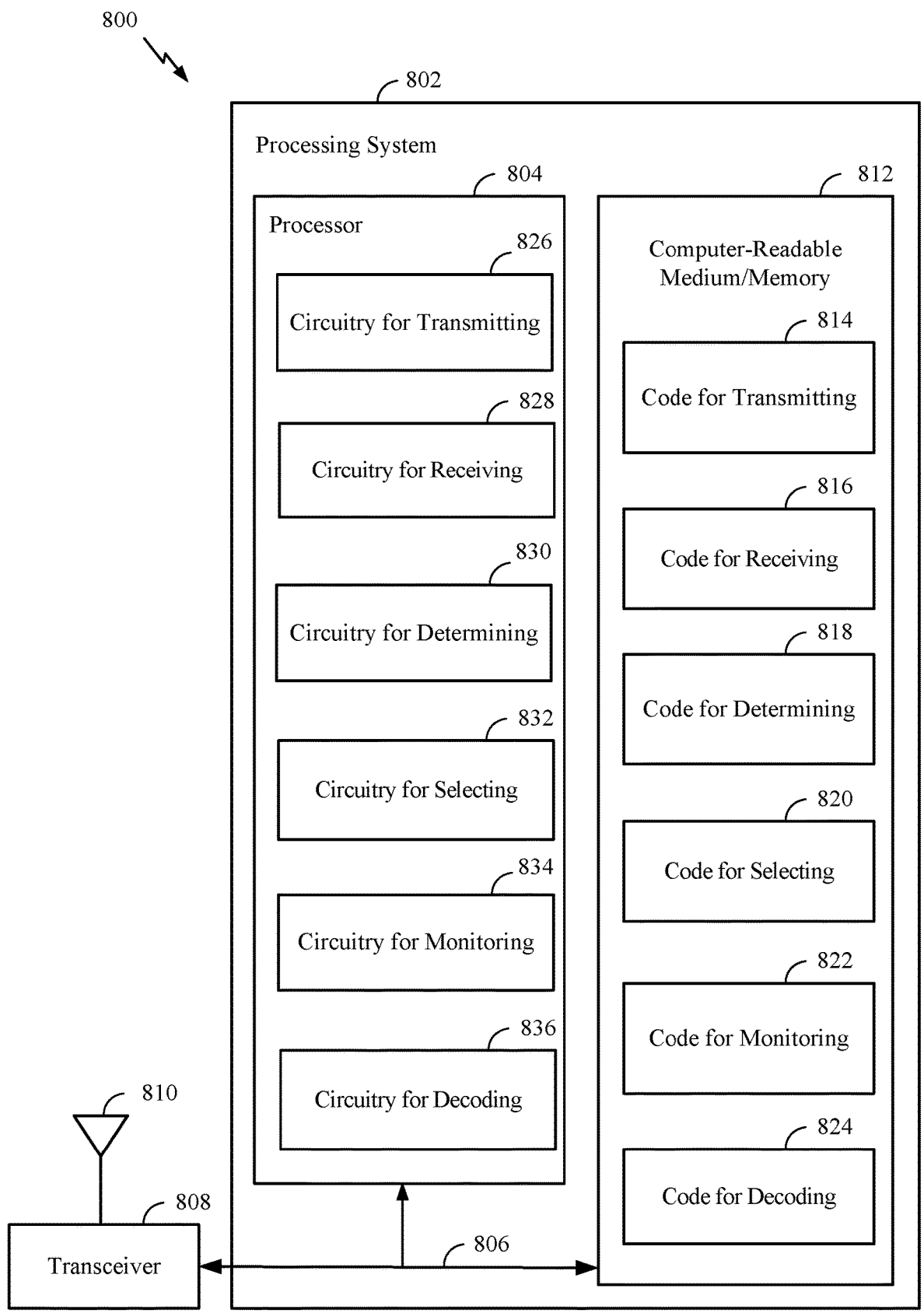
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) operable, configured, or adapted to perform operations for the techniques disclosed herein, such as the operations illustrated in FIG. 5. In some examples, communication device 800 may be a UE, such as UE 120a as described, for example with respect to FIGS. 1 and 2.

Communications device 800 includes a processing system 802 (e.g., corresponding to controller/processor 280) coupled to a transceiver 808 (e.g., a transmitter and/or a receiver). Transceiver 808 may correspond to one or more of the transmit processor 264, TX MIMO processor 266, modulator/demodulator 254, the receive processor 258, and the MIMO detector 256. Transceiver 808 is configured to transmit and receive signals for the communications device 800 via an antenna 810, such as the various signals as described herein. Processing system 802 may be configured to perform processing functions for the communications device 800, including processing signals received and/or to be transmitted by the communications device 800.

Processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for blind decoding.

In certain aspects, computer-readable medium/memory 812 stores code 814 (an example means for) for transmitting; code 816 (an example means for) for receiving; code 818 (an example means for) for determining; and code 820 (an example means for) for selecting; code 822 (an example means for) monitoring; and code 824 (an example means for) for decoding.

In certain aspects, code 814 for transmitting may include code for transmitting a request for a minimum aggregation level of decoding candidates to be applied for determining the aggregation level threshold. In certain aspects, code 816 for receiving may include code for receiving an indication of the selected subset of the plurality of decoding candidates. In certain aspects, code 816 for receiving may include code for receiving an indication of the aggregation level threshold. In certain aspects, code 816 for receiving may include code for receiving an indication to activate or deactivate blind decoding using the subset of the plurality of decoding candidates. In certain aspects, code 818 for determining may include code for determining an aggregation level threshold, wherein the selection of the subset of the plurality of decoding candidates is based on the aggregation level threshold. In certain aspects code, 820 for selecting may include code for selecting a subset of a plurality of decoding candidates of a search space in a control channel based on a property of each of the subset of the plurality of decoding candidates. In certain aspects, code 820 for selecting may include code for selecting the aggregation level threshold from a set of aggregation level threshold options, the set of aggregation level threshold options being dependent on: a subcarrier spacing (SCS) associated with the control channel; a frequency range associated with the control channel; a capability of the UE; or any combination thereof. In certain aspects, code 820 for selecting may include code for selecting the subset of the plurality of search spaces to which the aggregation level threshold applies based on: a type of each of the subset of the plurality of search spaces; a radio network temporary identifier (RNTI) associated with each of the subset of the plurality of search spaces; a configuration of each of the subset of the plurality of search spaces; or any combination thereof. In certain aspects, code 822 for monitoring may include code for monitoring the subset of the plurality of decoding candidates. In certain aspects, code 824 for decoding may include code for decoding control information in the control channel based on the monitoring of the subset of the plurality of decoding candidates.

In certain aspects, the processor 804 has circuitry configured to implement the code stored in the computer-readable medium/memory 812. The processor 804 includes circuitry 826 (an example means for) for transmitting; circuitry 828 (an example means for) for receiving; circuitry 830 (an example means for) determining; circuitry 832 (an example means for) selecting; circuitry 834 (an example means for) for monitoring; and circuitry 836 (an example means for) for decoding.

In certain aspects, circuitry 826 for transmitting may include circuitry for transmitting a request for a minimum aggregation level of decoding candidates to be applied for determining the aggregation level threshold. In certain aspects, circuitry 828 for receiving may include circuitry for receiving an indication of the selected subset of the plurality of decoding candidates. In certain aspects, circuitry 828 for receiving may include circuitry for receiving an indication of the aggregation level threshold. In certain aspects, circuitry 828 for receiving may include circuitry for receiving an indication to activate or deactivate blind decoding using the subset of the plurality of decoding candidates. In certain aspects, circuitry 830 for determining may include circuitry for determining an aggregation level threshold, wherein the selection of the subset of the plurality of decoding candidates is based on the aggregation level threshold. In certain aspects, circuitry 832 for selecting may include circuitry for selecting a subset of a plurality of decoding candidates of a search space in a control channel based on a property of each of the subset of the plurality of decoding candidates. In certain aspects, circuitry 832 for selecting may include circuitry for selecting the aggregation level threshold from a set of aggregation level threshold options, the set of aggregation level threshold options being dependent on: a subcarrier spacing (SCS) associated with the control channel; a frequency range associated with the control channel; a capability of the UE; or any combination thereof. In certain aspects, circuitry 832 for selecting may include circuitry for selecting the subset of the plurality of search spaces to which the aggregation level threshold applies based on: a type of each of the subset of the plurality of search spaces; a radio network temporary identifier (RNTI) associated with each of the subset of the plurality of search spaces; a configuration of each of the subset of the plurality of search spaces; or any combination thereof. In certain aspects, circuitry 834 for monitoring may include circuitry for monitoring the subset of the plurality of decoding candidates. In certain aspects, circuitry 836 for decoding may include circuitry for decoding control information in the control channel based on the monitoring of the subset of the plurality of decoding candidates.

Figure 9:
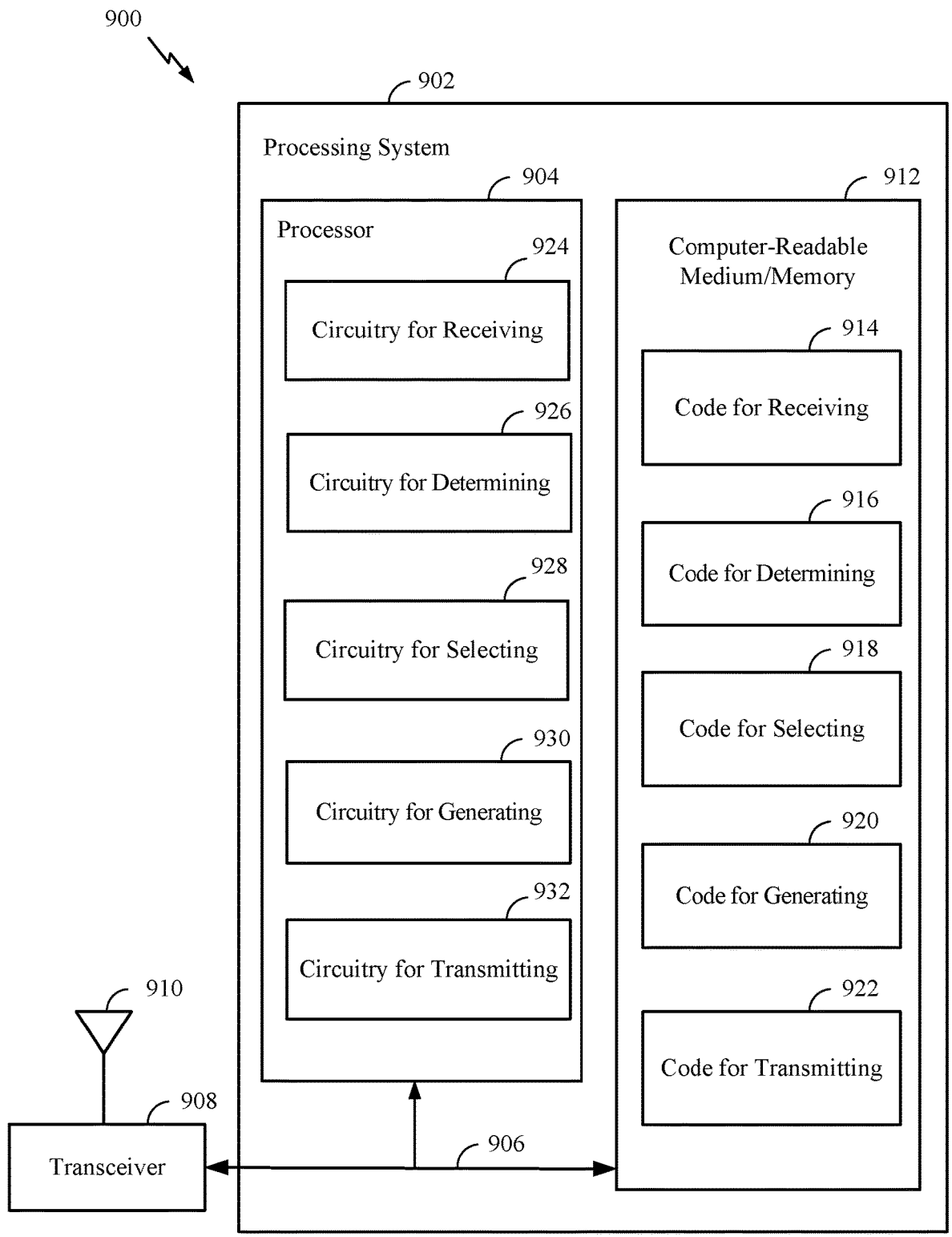
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 6. In some examples, communications device 900 may be a BS, such as BS 110a as described, for example, with respect to FIGS. 1 and 2.

Communications device 900 includes a processing system 902 (e.g., corresponding to controller/processor 240) coupled to a transceiver 908 (e.g., a transmitter and/or a receiver). Transceiver 908 may correspond to one or more of the transmit processor 220, TX MIMO processor 230, modulator/demodulator 232, the receive processor 238, and the MIMO detector 236. Transceiver 908 is configured to transmit and receive signals for the communications device 900 via an antenna 910, such as the various signals as described herein. Processing system 902 may be configured to perform processing functions for the communications device 900, including processing signals received and/or to be transmitted by the communications device 900.

Processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, instruct or cause the processor 904 to perform the operations illustrated in FIG. 6, or other operations for performing the various techniques discussed herein for security key derivation.

In certain aspects, computer-readable medium/memory 912 (e.g., corresponding to memory 242) stores code 914 (an example means for) for receiving; code 916 (an example means for) for determining; code 918 (an example means for) for selecting; code 920 (an example means for) for generating; and code 922 (an example means for) for transmitting.

In certain aspects, code 914 for receiving may include code for receiving, from the UE, a request for a minimum aggregation level of decoding candidates, wherein the determination of the aggregation level threshold is based on the request. In certain aspects, code 916 for determining may include code for determining an aggregation level threshold, wherein the selection of the subset of the plurality of decoding candidates is based on the aggregation level threshold. In certain aspects, code 918 for selecting may include code for selecting a subset of a plurality of decoding candidates of a search space in a control channel based on a property of each of the subset of the plurality of decoding candidates. In certain aspects, code 918 for selecting may include code for selecting the aggregation level threshold from a set of aggregation level threshold options, the set of aggregation level threshold options being dependent on: a subcarrier spacing (SCS) associated with the control channel; a frequency range associated with the control channel; a capability of the UE; or any combination thereof. In certain aspects, code 920 for generating may include code for generating the control channel having control information based on the selection. In certain aspects, code 922 for transmitting may include code for transmitting the control channel to a UE. In certain aspects, code 922 for transmitting may include code for transmitting, to the UE, an indication of the selected subset of the plurality of decoding candidates. In certain aspects, code 922 for transmitting may include code for transmitting, to the UE, an indication of the aggregation level threshold.

In certain aspects, the processor 904 has circuitry configured to implement the code stored in the computer-readable medium/memory 912. The processor 904 includes circuitry 924 (an example means for) for receiving; circuitry 926 (an example means for) for determining; circuitry 928 (an example means for) for selecting; circuitry 930 (an example means for) for generating; and circuitry 932 (an example means for) for transmitting.

In certain aspects, circuitry 924 for receiving may include circuitry for receiving, from the UE, a request for a minimum aggregation level of decoding candidates, wherein the determination of the aggregation level threshold is based on the request. In certain aspects, circuitry 926 for determining may include circuitry for determining an aggregation level threshold, wherein the selection of the subset of the plurality of decoding candidates is based on the aggregation level threshold. In certain aspects, circuitry 928 for selecting may include circuitry for selecting a subset of a plurality of decoding candidates of a search space in a control channel based on a property of each of the subset of the plurality of decoding candidates. In certain aspects, circuitry 928 for selecting may include circuitry for selecting the aggregation level threshold from a set of aggregation level threshold options, the set of aggregation level threshold options being dependent on: a subcarrier spacing (SCS) associated with the control channel; a frequency range associated with the control channel; a capability of the UE; or any combination thereof. In certain aspects, circuitry 930 for generating may include circuitry for generating the control channel having control information based on the selection. In certain aspects, circuitry 932 for transmitting may include circuitry for transmitting the control channel to a UE. In certain aspects, circuitry 932 for transmitting may include circuitry for transmitting, to the UE, an indication of the selected subset of the plurality of decoding candidates. In certain aspects, circuitry 932 for transmitting may include circuitry for transmitting, to the UE, an indication of the aggregation level threshold.

Configuration manager 112 and decoding manager 122 may support wireless communication in accordance with examples as disclosed herein.

Configuration manager 112 and decoding manager 122 may be an example of means for performing various aspects described herein. Configuration manager 112 or decoding manager 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, configuration manager 112 or decoding manager 122, or its sub-components, may be implemented in code (e.g., as configuration management software or firmware) executed by a processor, or any combination thereof. If implemented in code executed by a processor, the functions of configuration manager 112 or decoding manager 122, or its sub-components may be executed by a general-purpose processor, a DSP, an ASIC, a FPGA or other programmable logic device.

In some examples, configuration manager 112 or decoding manager 122 may be configured to perform various operations (e.g., receiving, determining, transmitting) using or otherwise in cooperation with the transceiver 808 or 908.

Configuration manager 112 or decoding manager 122, or its sub-components, may be physically located at various positions, including being distributed such that portions of functions are implemented at different physical locations by one or more physical components. In some examples, the configuration manager 112 or decoding manager 122, or its sub-components, may be a separate and distinct component in accordance with various aspects of the present disclosure. In some examples, configuration manager 112 or decoding manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Clause 1. A method for wireless communication by a base station (BS), comprising: selecting a subset of a plurality of decoding candidates of a search space in a control channel based on a property of each of the subset of the plurality of decoding candidates; generating the control channel having control information based on the selection; and transmitting the control channel to a user equipment (UE).

Clause 2. The method of Clause 1, wherein the property of each of the subset of the plurality of decoding candidates comprises: an aggregation level of each of the subset of the plurality of decoding candidates; a monitoring occasion of each of the subset of the plurality of decoding candidates; whether the plurality of the decoding candidates are aggregated across monitoring occasions; or any combination thereof.

Clause 3. The method of Clause 1 or 2, further comprising transmitting, to the UE, an indication of the selected subset of the plurality of decoding candidates.

Clause 4. The method of any of Clauses 1-3, further comprising determining an aggregation level threshold, wherein the selection of the subset of the plurality of decoding candidates is based on the aggregation level threshold.

Clause 5. The method of Clause 4, further comprising transmitting, to the UE, an indication of the aggregation level threshold.

Clause 6. The method of Clause 5, wherein the indication is transmitted via downlink control information (DCI) or medium access control-control element (MAC-CE).

Clause 7 The method of any of Clauses 4-6, wherein the determining of the aggregation level threshold comprises selecting the aggregation level threshold from a set of aggregation level threshold options, the set of aggregation level threshold options being dependent on: a subcarrier spacing associated with the control channel; a frequency range associated with the control channel; a capability of the UE; or any combination thereof.

Clause 8. The method of any of Clauses 4-7, further comprising receiving, from the UE, a request for a minimum aggregation level of decoding candidates, wherein the determination of the aggregation level threshold is based on the request.

Clause 9. The method of Clause 8, wherein the request is received via a uplink control information (UCI) or medium access control-control element (MAC-CE).

Clause 10. The method of Clause 8 or 9, wherein the request for the minimum aggregation level is implied based on a capability of the UE, power consumption limitations of the UE, whether the UE has requested coverage enhancement, or any combination thereof.

Clause 11. The method of any of Clauses 4-10, wherein the search space is one of a plurality of search spaces in the control channel, and wherein the aggregation level threshold is applied for a subset of the plurality of search spaces for determination of a subset of decoding candidates for each of the subset of the plurality of search spaces.

Clause 12. The method of Clause 11, further comprising selecting the subset of the plurality of search spaces to which the aggregation level threshold applies based on: a type of each of the subset of the plurality of search spaces; a RNTI associated with each of the subset of the plurality of search spaces; a configuration of each of the subset of the plurality of search spaces; or any combination thereof.

Clause 13. The method of any of Clauses 1-12, further comprising transmitting an indication to activate or deactivate blind decoding using the subset of the plurality of decoding candidates.

Clause 14. The method of Clause 13, wherein the indication to activate or deactivate the blind decoding using the subset of the plurality of decoding candidates is via a UE-specific downlink control information (DCI), a group-common DCI, or MAC-CE.

Clause 15. The method of Clause 14, wherein the activation or the deactivation of the blind decoding using the subset of the plurality of decoding candidates is associated with an expiration timer.

Clause 16. A method for wireless communication by a user equipment (UE), comprising: selecting a subset of a plurality of decoding candidates of a search space in a control channel based on a property of each of the subset of the plurality of decoding candidates; monitoring the subset of the plurality of decoding candidates; and decoding control information in the control channel based on the monitoring of the subset of the plurality of decoding candidates.

Clause 17. The method of Clause 16, wherein the property of each of the subset of the plurality of decoding candidates comprises: an aggregation level of each of the subset of the plurality of decoding candidates; a monitoring occasion of each of the subset of the plurality of decoding candidates; whether the plurality of the decoding candidates are aggregated across monitoring occasions; or any combination thereof.

Clause 18. The method of clause 16, further comprising receiving an indication of the selected subset of the plurality of decoding candidates.

Clause 19. The method of Clause 16, further comprising determining an aggregation level threshold, wherein the selection of the subset of the plurality of decoding candidates is based on the aggregation level threshold.

Clause 20. The method of Clause 19, further comprising receiving an indication of the aggregation level threshold.

Clause 21. The method of Clause 16, wherein the indication is transmitted via downlink control information (DCI) or medium access control-control element (MAC-CE).

Clause 22. The method of Clause 19, wherein the determining of the aggregation level threshold comprises selecting the aggregation level threshold from a set of aggregation level threshold options, the set of aggregation level threshold options being dependent on: a subcarrier spacing associated with the control channel; a frequency range associated with the control channel; a capability of the UE; or any combination thereof.

Clause 23. The method of Clause 19, further comprising transmitting a request for a minimum aggregation level of decoding candidates to be applied for determining the aggregation level threshold.

Clause 24. The method of Clause 23, wherein the request is transmitted via a uplink control information (UCI) or medium access control-control element (MAC-CE).

Clause 25. The method of Clause 23, wherein the request for the minimum aggregation level is implied based on a capability of the UE, power consumption limitations of the UE, whether the UE has requested coverage enhancement, or any combination thereof.

Clause 26. The method of Clause 19, wherein the search space is one of a plurality of search spaces in the control channel, and wherein the aggregation level threshold is applied for a subset of the plurality of search spaces for determination of a subset of decoding candidates for each of the subset of the plurality of search spaces.

Clause 27. The method of Clause 26, further comprising selecting the subset of the plurality of search spaces to which the aggregation level threshold applies based on: a type of each of the subset of the plurality of search spaces; a RNTI associated with each of the subset of the plurality of search spaces; a configuration of each of the subset of the plurality of search spaces; or any combination thereof.

Clause 28. The method of Clause 16, further comprising receiving an indication to activate or deactivate blind decoding using the subset of the plurality of decoding candidates.

Clause 29. The method of Clause 28, wherein the indication to activate or deactivate the blind decoding using the subset of the plurality of decoding candidates is via a UE-specific downlink control information (DCI), a group-common DCI, or MAC-CE.

Clause 30. The method of Clause 29, wherein the activation or the deactivation of the blind decoding using the subset of the plurality of decoding candidates is associated with an expiration timer.

Clause 31: An apparatus, comprising: a memory; and one or more processors coupled to the memory, the memory and the one or more processors being configured to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by one or more processors of an apparatus, cause the apparatus to perform a method in accordance with any one of Clauses 1-30.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user equipment (UE), comprising:
one or more processors individually or collectively configured to execute instructions stored on one or more memories and to cause the UE to:
select a subset of a plurality of decoding candidates of a search space in a control channel based on channel conditions associated with the control channel and on a property of each decoding candidate of the subset of the plurality of decoding candidates;
monitor the subset of the plurality of decoding candidates; and
decode control information in the control channel based on the monitoring of the subset of the plurality of decoding candidates.

2. The apparatus of claim 1, wherein the property of each decoding candidate of the subset of the plurality of decoding candidates comprises:
an aggregation level of each decoding candidate of the subset of the plurality of decoding candidates;
a monitoring occasion of each decoding candidate of the subset of the plurality of decoding candidates;
whether the plurality of decoding candidates are aggregated across monitoring occasions; or
any combination thereof.

3. The apparatus of claim 1, wherein the one or more processors are further configured to cause the UE to receive an indication of the selected subset of the plurality of decoding candidates.

4. The apparatus of claim 1, wherein:
the one or more processors are further configured to cause the UE to determine an aggregation level threshold, and
the one or more processors are configured to cause the UE to select the subset of the plurality of decoding candidates based on the aggregation level threshold.

5. The apparatus of claim 4, wherein the one or more processors are further configured to cause the UE to receive an indication of the aggregation level threshold.

6. The apparatus of claim 5, wherein the indication is received via downlink control information (DCI) or medium access control-control element (MAC-CE).

7. The apparatus of claim 4, wherein, in order to determine the aggregation level threshold, the one or more processors are configured to cause the UE to select the aggregation level threshold from a set of aggregation level threshold options, the set of aggregation level threshold options being dependent on:
a subcarrier spacing (SCS) associated with the control channel;
a frequency range associated with the control channel;
a capability of the UE; or
any combination thereof.

8. The apparatus of claim 4, wherein the one or more processors are further configured to cause the UE to transmit a request for a minimum aggregation level of decoding candidates to be applied for determining the aggregation level threshold.

9. The apparatus of claim 8, wherein the request is transmitted via an uplink control information (UCI) or medium access control-control element (MAC-CE).

10. The apparatus of claim 8, wherein the request for the minimum aggregation level is implied based on a capability of the UE, power consumption limitations of the UE, whether the UE has requested coverage enhancement, or any combination thereof.

11. The apparatus of claim 4, wherein the search space is one of a plurality of search spaces in the control channel, and wherein the aggregation level threshold is applied for a subset of the plurality of search spaces for determination of a subset of decoding candidates for each decoding candidate of the subset of the plurality of search spaces.

12. The apparatus of claim 11, wherein the one or more processors are further configured to cause the UE to select the subset of the plurality of search spaces to which the aggregation level threshold applies based on:
a type of each decoding candidate of the subset of the plurality of search spaces;
a radio network temporary identifier (RNTI) associated with each decoding candidate of the subset of the plurality of search spaces;
a configuration of each decoding candidate of the subset of the plurality of search spaces;
or any combination thereof.

13. The apparatus of claim 1, wherein the one or more processors are further configured to cause the UE to receive an indication to activate or deactivate blind decoding using the subset of the plurality of decoding candidates.

14. The apparatus of claim 13, wherein the indication to activate or deactivate the blind decoding using the subset of the plurality of decoding candidates is via a UE-specific downlink control information (DCI), a group-common DCI, or MAC-CE.

15. The apparatus of claim 14, wherein the activation or the deactivation of the blind decoding using the subset of the plurality of decoding candidates is associated with an expiration timer.

16. An apparatus for wireless communication by a network entity, comprising:
one or more processors individually or collectively configured to execute instructions stored on one or more memories and to cause the network entity to:
select a subset of a plurality of decoding candidates of a search space in a control channel based on channel conditions associated with the control channel and on a property of each decoding candidate of the subset of the plurality of decoding candidates;
generate the control channel having control information based on the selection; and
transmit the control channel to a user equipment (UE).

17. The apparatus of claim 16, wherein the property of each decoding candidate of the subset of the plurality of decoding candidates comprises:
an aggregation level of each decoding candidate of the subset of the plurality of decoding candidates;
a monitoring occasion of each decoding candidate of the subset of the plurality of decoding candidates;
whether the plurality of decoding candidates are aggregated across monitoring occasions; or
any combination thereof.

18. The apparatus of claim 16, wherein the one or more processors are further configured to cause the network entity to transmit, to the UE, an indication of the selected subset of the plurality of decoding candidates.

19. The apparatus of claim 16, wherein the one or more processors are further configured to cause the network entity to determine an aggregation level threshold, wherein the memory and the one or more processors are configured to select the subset of the plurality of decoding candidates based on the aggregation level threshold.

20. The apparatus of claim 19, wherein the one or more processors are further configured to cause the network entity to transmit, to the UE, an indication of the aggregation level threshold.

21. The apparatus of claim 20, wherein the indication is transmitted via downlink control information (DCI) or medium access control-control element (MAC-CE).

22. The apparatus of claim 19, wherein, in order to determine the aggregation level threshold, the one or more processors are configured to cause the network entity to select the aggregation level threshold from a set of aggregation level threshold options, the set of aggregation level threshold options being dependent on:
a subcarrier spacing (SCS) associated with the control channel;
a frequency range associated with the control channel;
a capability of the UE; or
any combination thereof.

23. The apparatus of claim 20, wherein the one or more processors are further configured to cause the network entity to receive, from the UE, a request for a minimum aggregation level of decoding candidates, wherein the determination of the aggregation level threshold is based on the request.

24. The apparatus of claim 23, wherein the request is received via an uplink control information (UCI) or medium access control-control element (MAC-CE).

25. The apparatus of claim 23, wherein the request for the minimum aggregation level is implied based on a capability of the UE, power consumption limitations of the UE, whether the UE has requested coverage enhancement, or any combination thereof.

26. A method for wireless communication by a user equipment (UE), comprising:
selecting a subset of a plurality of decoding candidates of a search space in a control channel based on channel conditions associated with the control channel and on a property of each decoding candidate of the subset of the plurality of decoding candidates;
monitoring the subset of the plurality of decoding candidates; and
decoding control information in the control channel based on the monitoring of the subset of the plurality of decoding candidates.

27. The method of claim 26, wherein the property of each decoding candidate of the subset of the plurality of decoding candidates comprises:
an aggregation level of each decoding candidate of the subset of the plurality of decoding candidates;
a monitoring occasion of each decoding candidate of the subset of the plurality of decoding candidates;
whether the plurality of decoding candidates are aggregated across monitoring occasions; or
any combination thereof.

28. The method of claim 26, further comprising receiving an indication of the selected subset of the plurality of decoding candidates.

29. A method for wireless communication by a network entity, comprising:
selecting a subset of a plurality of decoding candidates of a search space in a control channel based on channel conditions associated with the control channel and on a property of each decoding candidate of the subset of the plurality of decoding candidates;
generating the control channel having control information based on the selection; and
transmitting the control channel to a user equipment (UE).

30. The method of claim 29, wherein the property of each decoding candidate of the subset of the plurality of decoding candidates comprises:
an aggregation level of each decoding candidate of the subset of the plurality of decoding candidates;
a monitoring occasion of each decoding candidate of the subset of the plurality of decoding candidates;
whether the plurality of decoding candidates are aggregated across monitoring occasions; or
any combination thereof.

* * * * *